US009916547B2

(12) United States Patent
Martinez Moneo et al.

(10) Patent No.: US 9,916,547 B2
(45) Date of Patent: Mar. 13, 2018

(54) METHOD FOR MANAGING A MANUFACTURING PLANT FOR THE PRODUCTION OF CARBON FIBER PIECES

(71) Applicant: Airbus Operations S.L., Getafe (ES)

(72) Inventors: Ivan Martinez Moneo, Getafe (ES); Jose Ramon Montalban Mora, Getafe (ES)

(73) Assignee: Airbus Operations, S.L., Getafe (ES)

( * ) Notice: Subject to any disclaimer, the term of this patent is extended or adjusted under 35 U.S.C. 154(b) by 336 days.

(21) Appl. No.: 14/558,272

(22) Filed: Dec. 2, 2014

(65) Prior Publication Data
US 2015/0153727 A1 Jun. 4, 2015

(30) Foreign Application Priority Data

Dec. 3, 2013 (EP) ..................................... 13382491

(51) Int. Cl.
*G05B 19/418* (2006.01)
*G06Q 10/06* (2012.01)

(52) U.S. Cl.
CPC ....... *G06Q 10/06* (2013.01); *G05B 19/41875* (2013.01); *Y02P 90/22* (2015.11); *Y02P 90/84* (2015.11)

(58) Field of Classification Search
CPC .. G05B 19/14; G05B 19/41875; G06Q 10/06; Y02P 90/22
USPC .......................................... 702/188; 700/105
See application file for complete search history.

(56) References Cited

U.S. PATENT DOCUMENTS

| 6,198,980 | B1 * | 3/2001 | Costanza | G05B 19/41865 |
| | | | | 700/97 |
| 6,948,370 | B2 * | 9/2005 | Chatellier | G01N 19/04 |
| | | | | 427/8 |
| 7,006,878 | B2 * | 2/2006 | Schweizerhof | G06Q 10/06 |
| | | | | 700/108 |
| 8,667,844 | B1 * | 3/2014 | Broadbent | G01N 19/04 |
| | | | | 73/150 A |
| 2002/0099463 | A1 | 7/2002 | Sakaguchi | |
| 2005/0119863 | A1 * | 6/2005 | Buikema | G05B 19/4184 |
| | | | | 702/188 |

(Continued)

OTHER PUBLICATIONS

"Tecnologia espanola para inyectar mas ritmo a Airbus", Magarino, Mar. 2, 2014.

(Continued)

*Primary Examiner* — Yuhui R Pan
(74) *Attorney, Agent, or Firm* — Greer, Burns & Crain, Ltd.

(57) ABSTRACT

A method for managing a plurality of equipment pieces and operations within a factory for the manufacture of carbon fiber pieces, in order to increase production rate and reduce thereby manufacturing costs. In the method of the invention, collected production times are classified as added value production time or as wasted production time, and an efficiency parameter is calculated as a proportion between the sum of the added value production times, and a period of production time needed to complete said operation. Based on that efficiency parameter, causes for said wasted production times are identified and corrected. The invention provides a methodology for detecting and correcting causes which reduce production efficiency, in industries with low productivity cadence.

15 Claims, 1 Drawing Sheet

(56) References Cited

U.S. PATENT DOCUMENTS

| | | | |
|---|---|---|---|
| 2005/0177260 A1* | 8/2005 | Schweizerhof | G06Q 10/06 700/97 |
| 2008/0010109 A1 | 1/2008 | Ide | |
| 2008/0244588 A1* | 10/2008 | Leiserson | G06F 9/4881 718/102 |
| 2008/0256406 A1* | 10/2008 | Arnold | G01R 31/31912 714/727 |
| 2011/0290421 A1* | 12/2011 | Santos Gomez | G01B 11/14 156/360 |
| 2014/0342144 A1* | 11/2014 | Nakayama | C08J 5/24 428/220 |

OTHER PUBLICATIONS

"Luce IT presenta la primera herramienta de mantenimiento predictivo que permite detectar los fallos en los.." Anonymous, Mar. 27, 2013.
"Change in the air aerospace industry", Burnell et al., Mar. 1, 2007.
"Seven Wastes Elimination Targeted by Lean Manufacturing Case Study", Khlil et al., Jan. 1, 2013.
"Luce IT en matic 2013: Presentacion de OEE Pro", Anonymous, Mar. 27, 2014.
"OEE Pro-LInkedIn", Anonymous, Mar. 27, 2014.
European Search Report, dated Mar. 31, 2014.

* cited by examiner

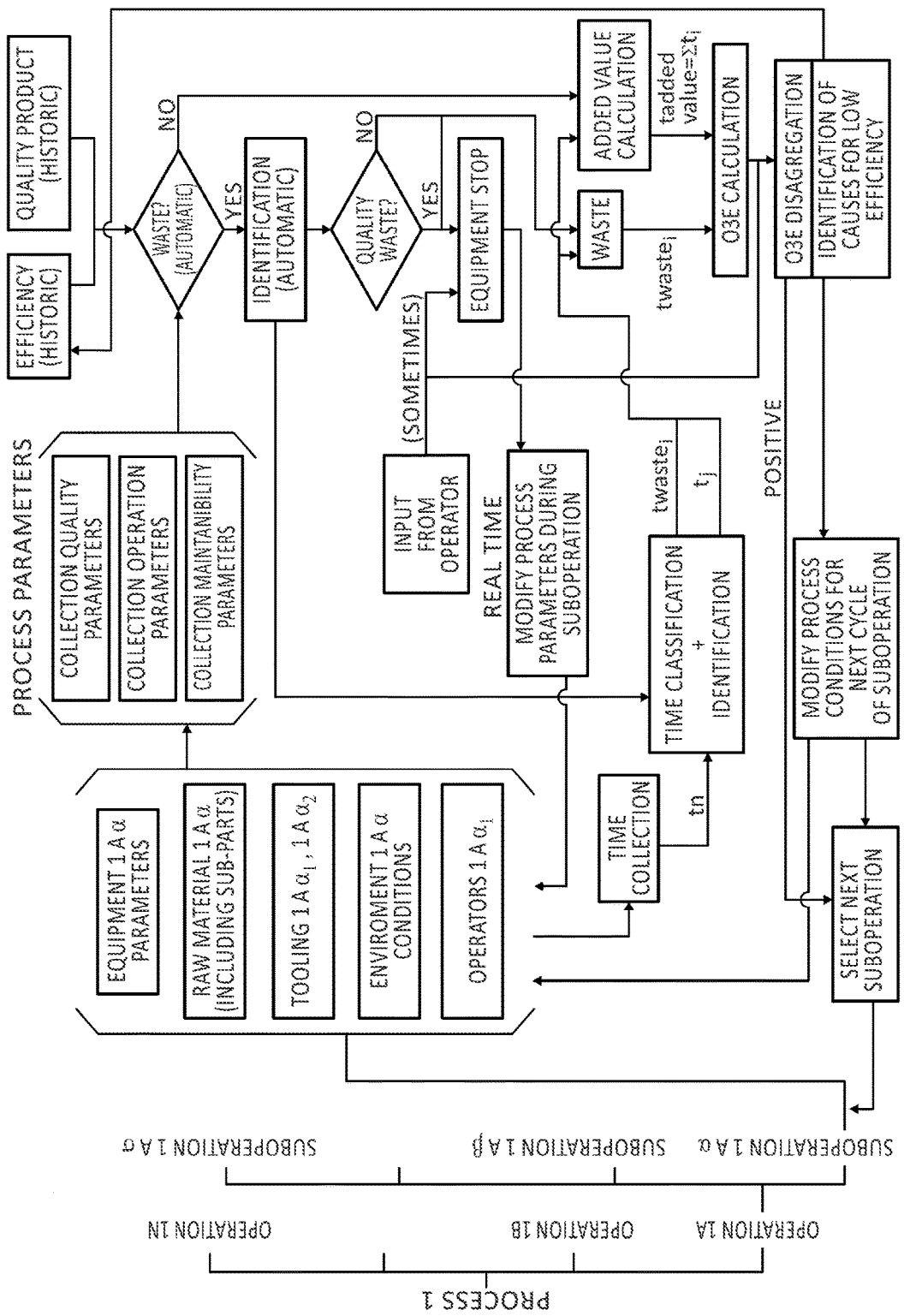

METHOD FOR MANAGING A MANUFACTURING PLANT FOR THE PRODUCTION OF CARBON FIBER PIECES

CROSS-REFERENCES TO RELATED APPLICATIONS

This application claims the benefit of the European patent application No. 13382491.2 filed on Dec. 3, 2014, the entire disclosures of which are incorporated herein by way of reference.

BACKGROUND OF THE INVENTION

The present invention refers in general to the manufacture of carbon fiber pieces or structures, preferably in the aeronautical industry.

More in particular, the invention refers to method for managing a plurality of equipment pieces and operations within a factory for the manufacture of carbon fiber pieces, in order to increase production rate and reduce thereby manufacturing costs. The method of the invention also allows detection and correction of causes of defects or low quality, hence the method of the invention also improves quality of the final product.

The invention provides a methodology for detecting and correcting causes which reduce production efficiency, in industries with low productivity cadence.

Traditional methodologies for improving the efficiency of a factory have been implemented mainly in the automotive industry, wherein Total Productive Maintenance (TPM) methods are used for improved machine availability through better utilization of maintenance and production resources.

The Overall Equipment Effectiveness (OEE) it is a well-known methodology for measuring efficiency of each facility or equipment in a factory. With the OEE a percentage value is calculated which indicates to what extent the actual effectiveness in each case reaches a planned production rate according to standards. OEE split the performance of a manufacturing unit into three separate but measurable concepts: availability, productivity, and quality. Therefore, the OEE is calculated as:

$$OEE = availability \times productivity \times quality.$$

Each concept of the equation points to an aspect of the process that can be improved.

The OEE is characterized by the following aspects:

Good pieces are considered rather than defective pieces.
Real manufactured pieces are considered rather than planned pieces.
Various pieces are necessary for an OEE to be calculated.
The OEE is mostly suitable for processes wherein quality control is based on a selection "pass-not pass", wherein it is economically acceptable to convert defective products into scrap, since the value of the piece or added value of the process is not too high.
The OEE comprises "x" pieces manufactured in one period of time, e.g.: an OEE of 85% for 2000 pieces manufactured in 2 days.
Time which has not been productive is subtracted from the time scheduled according to standards for the pieces (100% OEE).
The OEE starts at 100%, this percentage representing the total time scheduled to produce various pieces. Once the scheduled time has elapsed it is determined whether or not all the pieces hoped for have been manufactured. When there are fewer units, the difference is assigned to each one of the six OEE loss categories. The OEE percentage is calculated by dividing the good pieces produced by the number of planned pieces.

The US patent applications US2008/0010109A1, US2002/0099463A1 are examples of systems for managing a plurality of equipment pieces based on the calculation of the OEE.

The OEE (Overall Equipment Effectiveness) is, by definition, the measurement of the overall efficiency of a machine, thus, it is only possible to measure efficiency of that machine after a large number of units have been produced. However, the OEE is not capable of measuring efficiency during each operation or sub-process needed for the manufacture of a single piece or unit. Specifically, the OEE is not a suitable methodology to measure efficiency in those operations where the quality of a piece cannot be measured as soon as it has been produced, but after several days or even weeks, as is the case of the production of carbon fiber components for the aeronautical industry.

Consequently, the OEE is a suitable method for measuring efficiency in traditional industries such as metallurgy in general, automotive industry, electronic components, etc., wherein large series of pieces are produced per day with standard quality, and wherein the quality control is based on the concept good pieces—pass/defective pieces—do not pass.

However, during the conception of the present invention, it has been realized that for other types of industries with different production dynamic with low cadence of produced pieces, wherein the manufacturing process is highly sophisticated and complex, the OEE is not a good methodology to improve efficiency, because the OEE is not capable of measuring adequately all aspects influencing final product quality, process efficiency and optimal equipment performance.

In the case of factories with low production cadence, such as a factory for the production of carbon fiber components for the aeronautic industry, it might take even several days to produce for example a single panel made of carbon fiber.

The operation of equipment pieces and processes used for processing carbon fiber, such a Tape Laying Technology (ATL) equipment, a fiber placement equipment, etc., is highly complex and is affected by many operating parameters influencing directly in the quality of the final product.

The application of the OEE to such equipment pieces and processes, only serve to correct minor factors and to take few superficial correcting actions, with no practical effect in improving efficiency of the process. Many relevant operating parameters would not be considered by the OEE, thus, significant problems or causes of low effectiveness remain hidden to the method and are not corrected.

SUMMARY OF THE INVENTION

The present invention satisfactorily solves the above-described drawbacks of the prior art, by providing a method for efficiently managing a plurality of equipment pieces and process for the production of carbon fiber pieces or structures.

The methodology developed in the present invention is capable of improving efficiency in order to reduce production costs, in factories for the manufacture of products whose complexity, value and difficulty in terms of manufacturing make it necessary to avoid any subsequent intervention in the same, and where the production of defective pieces is not acceptable. Unlike the OEE, in the method of the present invention, it is assumed that (in most of the cases) the number of good pieces is equal to the number of produced pieces, that is, no defective pieces are produced.

An aspect of the invention refers to a method for managing a factory or manufacturing plant for the production of carbon fiber pieces, such as CFRP, wherein the manufacturing plant includes one or more equipment pieces for processing carbon fiber. The term processing is to be interpreted here to include any operating step in which cured or uncured carbon fiber (for example a pre-form of carbon fiber) is being processed within the factory, or even during the delivery of a completed piece to a client, for example another factory where several pieces are assembled together.

The said equipment for processing carbon fiber, typically are automatic equipment and comprises any combination of the following equipment: an ATL (Tape Laying Technology) equipment, a fiber placement equipment, a carbon fiber cutting equipment, a trimming machine, an autoclave, a non-destructive test equipment, a hot forming equipment, etc.

The method of the invention comprises the step of collecting data related to quality parameters of uncured or cured carbon fiber to be supplied or being processed by the equipment. Examples of quality parameters are:
  tacking value of the uncured carbon fiber, which can be collected for example by an ultrasonic measuring device. Poor tacking of the uncured carbon fiber generates porosities due to lack of material grip.
  trimming process: generates delaminations. Detected in ultrasound examination.
  lack of layers: does not generate enough resistance in the piece. Detected in automatic examination.
  gap between strips of carbon fiber.
  inspection time used for inspecting the quality of a carbon fiber pieces being manufactured.

In the method of the invention, real-time data related to operation parameters of at least one of said equipment pieces, is also collected. Examples of these parameters are:
  compactor pressure: creates porosities if it is not adequate. This can be detected by ultrasound examination.
  compacting time for compacting carbon fiber plies.
  IMAS: a foreign object that accidentally reached the piece, for example a piece of plastic trapped between the layers. This can be detected in automatic examination.
  temperature and humidity of the working environment.
  planned stops and non-planned stops of an equipment.
  Gap between runs=>Quality
  Dampness=>Quality
  Operator=>Does not affect the result directly but some incidences are associated with Micro-stops
  Number of blade cycles=>Micro-stops
  Motor consumption=>Breakdown
  Frequency of ultrasonic monitoring=>Quality
  Compaction time=>Quality
  Time to review layer=>Quality
  P/N of the piece=>Does not affect the result directly
  Length of scrap=>Micro-stop These data related to the quality of the carbon fiber and the equipment operation, are collected continuously while the factory is operative, and are stored for example in a computer, for their subsequent processing.

A whole process for manufacturing a piece of carbon fiber, from the step of unpacking fresh carbon fiber to the transportation of a final product outside the factory, is divided is several operations.

In turn, each operation can be divided conveniently in several sub-operations, for monitoring the same.

More specifically, for the present description a process is defined as a set of operations (including operations performed in machines, manual, movement of pieces etc) within a factory for converting raw material (uncured carbon fiber) into a final product useful for a client (either a final client or a another factory of the same company).

An operation is defined as the steps of a process carried out with a single tool or machine, in a continuous manner, that is, without interruption. In turn, a sub-operation is defined in the present description, as any part of an operation which is defined arbitrarily. For that, starting and final stages of each particular sub-operation are defined, in order to observe recurrence and compare results of the same sub-process in the production of different pieces.

The method of the invention comprises the step of collecting production times associated to at least one operation and/or a sub-operation which is a part of the process needed for manufacturing of a single piece of carbon fiber. These production times are measured continuously automatically, and refer to the production time needed to complete one operation or a part of one operation. Preferably, all or most of the operations which are part of the whole process to product one unit, are monitored by collecting related production times.

Then, the collected production times are classified in two categories, either as added value production time or as wasted production time. For this classification, a predefined classification chart is used, preferably based on the seven wastes categories of Lean Manufacturing namely: Transport, Inventory, Movement, Waits, Over Production, Over Processing, and Defects.

The classification chart (or correlation model) for classifying the collected production times, is implemented by a computer program run in a computer. A skilled person in this field knows how program a computer to implement a classification chart for that purpose, thus, it is not considered necessary for this description to describe that classification chart in more detail.

As the production times are being collected and classified, an efficiency parameter is cyclically calculated at predefined intervals of time, which can be implemented for example by solving an equation in a computer.

The said efficiency parameter is calculated as a proportion between the sum of the added value production times, and a selected period of production time for which efficiency parameter is to be obtained, for example the time needed to complete an operation or a sub-operation within an operation.

The operations and sub-operations in which of the whole process is divided, can be redefined dynamically.

At pre-established period of times while a piece of equipment or facility of the factory is operative, for example every second, it is assessed whether the work produced by that equipment during that interval of time, implies or not an added value for the customer. When the analysis of that particular equipment or facility is completed, an efficiency parameter expressed as a percentage, is calculated by dividing the total time of the added value times by the total time considered.

The term added value for the customer is related to the economic concept of the seven Wastes of Lean Manufacturing is directly associated to what the final client is willing to pay. All those activities, processes, sub-products, installations etc., which imply expenditures for the manufacturer, but the value of which the customer is not willing to pay, are considered to be a waste. Each waste may be classified as belonging to one of the seven categories, within the production environment.

The analysis carried out in the factory on every movement and activity involving the equipment, is based on analyzing whether or not they brought value to a customer. When this is not the case, they are categorized within one of the seven waste groups. Examples of wasted production time are:

Defects: gap between runs, dampness, operator, quality loss need rework.

Delays: number of blade cycles, motor consumption, unplanned stop.

Over-processing: frequency of ultrasound monitoring, compaction time, time to review layer.

Inventory: P/N of the piece,

Movement: Length of scrap

Of the examples given above, length of scrap is directly related to the product Lead Time (the Process parameter) and does not generate added value. Thanks to the method of the present invention, that parameter or cause of low productivity, has been detected and corrected.

Therefore, that efficiency parameter calculated in accordance with this invention, may be regarded as an Overall Economic Equipment Effectiveness (O3E), since the effectiveness parameter is an indication of the economic value for the customers, which in turn is associated to a reduction of the manufacturing costs.

Unlike the OEE of the prior art, the O3E methodology of the present invention measures the added value brought to the client at each stage of the manufacturing process, for example based on the concept of the seven wastes, which is used to improve production efficiency by taking the necessary corrective actions in the equipment, material, process etc., to reduce or eliminate causes for low productivity.

Whereas the OEE of the prior art measures pieces which have been rendered defective due to an equipment problem, fewer pieces owing to some kind of equipment malfunction, etc, the O3E of the present invention measures effectiveness within a single unit or even within part of the manufacturing process of that unit.

Owing to the innate definition of the measuring means for each one (OEE=deducted time associated with lost pieces or pieces that could have been produced should efficiency have been higher; O3E=the sum of added value) there are O3E values for part/sub-process of a piece manufacturing process. However, in order to assign an OEE useful value, at least one piece is needed (OEE=0 to 100).

The O3E is based on manufacturing times, wherein various pieces (not an integral number) have been manufactured. E.g.: O3E from the morning shift when 1.33 pieces were manufactured.

One of the technical effects or advantages associated with the method of this invention, is that, the efficiency of each sub-operation of the production line, can be improved independently, so that the efficiency improvement of the whole process is optimized.

Calculation of the efficiency parameter O3E, is then used to identify causes for said wasted production times, for that, the calculated efficiency parameter is compared with a desired value for the efficiency parameter, and if there is a deviation, the parameters causing the wasted production times are identified and corrected until the wasted production times are reduced or eliminated.

The identification of causes for said wasted production times (low efficiency), is based on said collected data related to quality parameters of the carbon fiber, and the collected real-time data related to operation parameters of at least one of said pieces of equipment.

The O3E not only allows identification of the parameters causing low efficiency, but also when those parameters appear during production. If a cause (parameter) for low efficiency is detected to occur repeatedly at the same time, the method generates a preventive stop signal for interrupting the operation of one of said equipment affected by said parameter. Then, a corrective action is applied to said equipment, process and/or the related parameter is corrected to avoid said cause for low efficiency.

In order to identify more precisely a cause for wasted production times within an operation of the whole process, a fine-detection process is carried out wherein each operation is divided in several sub-operations, and then, said efficiency parameter is calculated for each one of said sub-operation and said identifying step is applied, until a cause of reduced efficiency for one of said sub-operations is detected.

While the factory is operative, said efficiency parameter is calculated cyclically for each operation implemented in one or more equipment pieces, preferably in those machines featuring mainly as the bottle neck in factory production, namely ATL and Fiber Placement as the most significant. Preferably, the efficiency parameter is calculated for all the equipment or facilities in the factory.

Deviations between the efficiency parameter calculated for each operation and a desired value, are monitored continuously, for that, real-time information related to the calculated equipment efficiency parameter for each operation and equipment, is displayed for example on a screen of a computer.

All or most of the parameters which may cause low effectiveness rate or quality problems, can be detected now with the method of this invention and consequently can be corrected or prevented. With prior art methodologies, those causes for low effectiveness would not be detected, and said quality problems could only be detected during the final inspection (using ultrasound technology), but the cause for those quality problems would remain unknown, so the quality problems can appear in the next manufacturing cycle.

The following parameters are examples of waste types, which are measured by the O3E and reduced or prevented:

Movement=the machine positions scrap at various points of the area intended for this purpose=>Micro-stop.

Delays=the machine cannot operate because the operator/worker is carrying out a manual operation within the work area=>Preparation.

Delays=the operator should manually remove certain runs which have been inadequately positioned as a result of defects originating from the raw material; machine stopped=>Quality.

Over-processing=the machine should repeat specific runs given its design=>Quality.

Defects=the raw material does not come with the level of adherence (tacking) required thus leading to localized defects in some parts of the piece=>Quality.

BRIEF DESCRIPTION OF THE DRAWINGS

Preferred embodiments of the invention, are henceforth described with reference to the accompanying drawings, in which:

The FIGURE is a flow chart illustrating an exemplary embodiment of the method of the invention.

DETAILED DESCRIPTION OF THE PREFERRED EMBODIMENTS

The FIGURE illustrates a method for managing a manufacturing plant for the production of carbon fiber pieces according to the invention, wherein it is shown how a process for manufacturing a piece or unit, is divided, into several operations which in turn are divided into sub-operations for the calculation of an efficiency parameter.

In particular a Process 1 for manufacturing a piece or unit of carbon fiber, is divided for the purpose of the present invention, in several operations ($1_A$, $1_B$ ... $1_N$) which in turn are divided in sub-operations ($1_{A\alpha}$, $1_{A\beta}$... $1_{A\theta}$) for monitoring each one of them and for the calculation of an efficiency parameter (O3E).

Examples of operations are: laying up of composite plies to form a panel, a stringer, torsion box, cutting out scrap, etc. Some of these operations may need hours and even several days to be completed. An operation ($1_A$, $1_B$ ... 1N) is carried out with a single tool or machine, in a continuous manner, that is, without interruption.

In the diagram of the FIGURE, within the same operation ($1_A$, $1_B$... $1_N$), an efficiency parameter (O3E$1_{A\alpha}$) is calculated for Sub-operation ($1_{A\alpha}$), an efficiency parameter (O3E$1_{A\beta}$) is calculated for Sub-operation ($1_{A\beta}$) etc. Then, an efficiency parameter (O3E$1_A$) is then obtained for Operation (1A), an efficiency parameter (O3E$1_B$) is obtained for Operation (1B), etc.

Each Sub-operation, for example Sub-operation ($1_{A\alpha}$), is monitored taking into account process parameters associated to (any combination of): equipment, raw material (or sub-parts of a piece to be treated in the process), tooling, environment conditions and operators, participating in that Sub-operation. From these elements of the process, three main groups of process parameters are collected: quality parameters (data), operation parameters, and maintainability parameters. For example, parameters related to quality of carbon fiber to be supplied to the equipment are collected, as well as real-time data related to operation parameters of the equipment forming part of the manufacturing plant, or environment conditions such as temperature, humidity, etc.

The collected process parameters of these three groups, are then compared with stored historic data related to efficiency and product quality obtained in previous manufacturing cycles, in order to automatically determine whether, according to the historic results, the parameters that are now being collected can be classified as a waste or not. This process is represented in FIG. 1 by the decision module (Waste?).

As a result of the decision process, if a parameter is considered a waste, the method automatically identifies the type of waste, for example a waste is associated to poor quality of the raw material, a defect of the piece which is being produced, environment temperature is not acceptable, etc.

Subsequently, it is checked whether the parameters considered as waste in the previous process, are related or not to the quality of the piece of carbon fiber which is being produced at that time, for example, the tacking value of the raw material is not satisfactory, unacceptable gaps or porosities in the piece are detected. This process is represented in the FIGURE by the decision module (Quality Waste?).

As soon as a parameter which could affect the quality of the piece is detected, a preventive stop of the associated equipment is ordered, in order to correct the deficiency by modifying in real time the related process parameter and prevent the quality of the piece from being affected. If a defect has already been produced to the piece, this is repaired before resuming the manufacturing process.

An equipment stop can also be ordered any time by a human operator when a defect or malfunction of the process is detected, for example in those parts of the process which cannot be monitored by a sensor. These manual preventive stops are always performed in accordance with predetermined standard procedures.

In the method of the invention, production times (tn) are also continuously collected from the operation of the equipment, operators, etc. These collected production times (tn), are then classified and identified as added value production time or as wasted production time, in accordance with a predefined classification chart, for example based on the lean seven wastes categories. The identification of the collected production times, is performed based in the information received from the above-mentioned waste identification process.

As a result of this classification and identification process of the production times, the method generates in the form of data, wasted production times ($t_{wasted\ (i)}$) associated to particular types of wastes, and added value production times ($t_j$). Both types of times, are then fed to an efficiency parameter (O3E) calculation module. The added value production times ($t_j$) are first received in an (Added Value Time Calculation Module) allowed by the decision module (Waste?), only when no waste is detected. The added value production times ($t_j$) are added in the (Added Value Time Calculation Module) to provide an added value production time ($t_{added\ value}$), that is, ($t_{added\ value}$)=$\Sigma(t_j)$.

On the other hand, the wasted production times ($t_{wasted\ (i)}$) are directed to the (O3E) calculation module, allowed by the (Quality Waste?) decision module, when a quality waste is detected.

The efficiency parameter (O3E) is then calculated by the (O3E) calculation module, as a proportion between the sum of the added value production times ($t_{added\ value}$), and a selected period of production time for which efficiency parameter is to be obtained, for example the time needed to complete an operation within a process, or a sub-operation within an operation.

If the calculated efficiency parameter does not reach a desired value for an operation or a sub-operation, then causes for said low efficiency are identified based on said real time collected data. For the identification of those wasted production times, a correlation is applied taking into account the collected parameters of the process. Once the causes for said low efficiency are identified, this information is saved in order to modify the associated process conditions of the affected Sub-operation, in the next manufacturing cycle, in order to reduce said wasted production times for a particular operation or sub-operation, and consequently improve the O3E efficiency.

Once the (O3E) has been calculated and the causes for low efficiency, if any, have been detected, another Sub-operation is selected and the process is repeated for that Sub-operation. An efficiency parameter (O3E) is calculated for each or most of the operations and sub-operations, from which the efficiency of a complete Process 1 can be obtained.

Due to the large number of collected parameters and the way they are classified, the method of the invention is capable of improving quality and efficiency of every sub-operation of an operation, hence, quality and efficiency of an operation for which its sub-operations have already been optimized, is improved exponentially.

Examples of how, upon measuring the O3E, we have been able to influence the production process, which we wouldn't have done if we measured the OEE.

New process control=measuring tacking in the workshop. Porosities have been eliminated.

Change of direction in the positioning of runs in order to avoid IMAS in the piece.

Frekote (mold release agent) control in the piece in order to assist its removal from the mold and to prevent porosities from appearing.

Example of the O3E for the manufacturing a panel for a rear section of an aircraft during 1 shift:

O3E: Availability: 85%, Output: 25%, Quality: 75%, O3E: 16%.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for managing a manufacturing plant for a production of carbon fiber pieces, the manufacturing plant including one or more equipment pieces for processing carbon fiber, the method comprising the steps of:
    collecting data related to quality parameters of carbon fiber to be supplied to the equipment,
    collecting real-time data related to operation parameters of at least one of said equipment which has received said carbon fiber,
    collecting actual production tines associated to at least one operation which is a part of a process for manufacturing one carbon fiber component from said carbon fiber,
    classifying the actual production times as added value production time or as wasted production time, in accordance with a predefined classification chart,
    calculating an efficiency parameter for said operation,
    wherein said efficiency parameter is calculated as a proportion between the sum of the added value production times, and a period of production time needed to complete said operation,
    comparing the calculated efficiency parameter with a desired value of the efficiency parameter, and if there is a deviation, then identifying causes for said wasted production times based on said collected data relative to quality parameters, said collected real-time data related to operation parameters, or both,
    during the process for manufacturing of said one carbon fiber component, correcting at least one of said quality parameters or said operation parameters in order to reduce said wasted production times for producing said one carbon fiber component, and,
    generating a preventive stop signal to interrupt the operation of one of said equipment pieces, when a cause for reduced efficiency has been detected, and taking a corrective action in said equipment and/or a collected parameter to avoid said cause for reduced efficiency.

2. The method according to claim 1, further comprising the step of defining at least one sub-operation forming part of said operation, and calculating said efficiency parameter for said sub-operation, and repeating that step until a cause of reduced efficiency for one of said sub-operations is detected.

3. The method according to claim 1, further comprising the step of cyclically calculating said efficiency parameter for each operation implemented in two or more of said equipment pieces, and continuously detecting deviations from a desired value of the efficiency parameter for each operation.

4. The method according to claim 1, further comprising the step of modifying said classification chart for classifying the actual production times, based on stored historical results of calculated efficiency parameter.

5. The method according to claim 1, wherein said equipment pieces for processing carbon fiber are any combination of two or more equipment pieces selected from the list: an ATL (Tape Laying Technology) equipment, a fiber placement equipment, a carbon fiber cutting equipment, a trimming machine, an autoclave, a non-destructive test equipment, a hot forming equipment.

6. The method according to claim 1, wherein the collected data related to the quality of carbon fiber is taken from uncured carbon fiber and includes a tacking value of the carbon fiber, and wherein said tacking value is collected by an ultrasonic measuring device.

7. The method according to claim 1, wherein the collected data related to the operation of at least one of said equipment pieces comprises: scrap length, environment humidity, gap between strips of carbon fiber, compacter pressure, planned stops and non-planned stops of the equipment.

8. The method according to claim 1, further comprising collecting data related to: inspection time used for inspecting the quality of a carbon fiber pieces being manufactured, and compacting time for compacting carbon fiber plies.

9. The method according to claim 1, wherein the collected data is stored in a computer, and wherein the classification chart for classifying the actual production times, is implemented by computer program run in said computer.

10. The method according to claim 1, wherein the classification chart for classifying actual production times includes the lean seven wastes categories.

11. The method according to claim 1, wherein said efficiency parameter is calculated by solving a stored equation in a computer.

12. The method according to claim 1, wherein a number of good carbon fiber pieces is equal to a number of produced carbon fiber pieces.

13. The method according to claim 1, further comprising the step of displaying real-time information related to the calculated equipment efficiency parameter.

14. A method for managing a manufacturing plant for a production of carbon fiber pieces, the method comprising:
    supplying one or more materials comprising carbon fiber to an equipment piece configured to perform at least one operation on said materials to produce a single unit, wherein said operation includes a plurality of sub-operations;
    obtaining data related to at least one quality parameter of the carbon fiber supplied to the equipment piece;
    obtaining real-time data related to operation parameters of said equipment piece;
    obtaining actual production times associated to at least one sub-operation;
    classifying the actual production times as added value production time or as wasted production time, in accordance with a predefined classification chart;

calculating an efficiency parameter for said operation associated with the production of said single unit, wherein said efficiency parameter is calculated as a proportion between the sum of added value production times from the sub-operations, and a period of production time needed to complete said operation;

comparing the calculated efficiency parameter with a desired value of the efficiency parameter, and if there is a deviation, then identifying causes for said wasted production times based on said collected data relative to quality parameters, said collected real-time data related to operation parameters, or both; and, during the production of said single unit, controlling said equipment piece to correct at least one of said quality parameters or said operation parameters in order to reduce said wasted production times for the production of said single unit.

15. A method for managing a manufacturing plant for a production of carbon fiber pieces, the method comprising;

supplying one or more materials comprising carbon fiber to a plurality of equipment pieces;

processing said one or more materials with said equipment pieces to produce a final product comprising the carbon fiber, each equipment piece configured to perform at least one operation on said materials, wherein each operation includes a plurality of sub-operations;

obtaining data related to at least one quality parameter of the materials supplied to said equipment pieces;

obtaining real-time data related to operation parameters of said equipment pieces;

obtaining actual production times associated to at least one sub-operation;

classifying the actual production times as added value production time or as wasted production time, in accordance with a predefined classification chart;

calculating an efficiency parameter for said operation, wherein said efficiency parameter is calculated as a proportion between the sum of added value production times from the sub-operations, and a period of production time needed to complete said operation;

comparing the calculated efficiency parameter with a desired value of the efficiency parameter, and if there is a deviation, then identifying causes for said wasted production times based on said collected data relative to quality parameters, said collected real-time data related to operation parameters, or both; and, during production of the final product, controlling said equipment piece to correct at least one of said quality parameters or said operation parameters in order to reduce said wasted production times for said operation for producing the final product.

* * * * *